(12) United States Patent
Roberge et al.

(10) Patent No.: US 10,278,326 B2
(45) Date of Patent: May 7, 2019

(54) FERTILIZER APPLICATION SYSTEM USING PNEUMATIC CONVEYING WITH LARGE DIAMETER LINES AND ROTARY DISTRIBUTOR

(71) Applicant: CNH Industrial Canada, Ltd., Saskatoon (CA)

(72) Inventors: Martin J. Roberge, Saskatoon (CA); Joel Denis, Saskatoon (CA); Rex L. Ruppert, Benson, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 11 days.

(21) Appl. No.: 15/613,900

(22) Filed: Jun. 5, 2017

(65) Prior Publication Data

US 2018/0343791 A1 Dec. 6, 2018

(51) Int. Cl.
| | |
|---|---|
| *A01C 15/14* | (2006.01) |
| *A01C 7/08* | (2006.01) |
| *A01C 15/00* | (2006.01) |
| *A01C 15/04* | (2006.01) |
| *A01M 9/00* | (2006.01) |

(52) U.S. Cl.
CPC ............... *A01C 15/14* (2013.01); *A01C 7/08* (2013.01); *A01C 15/006* (2013.01); *A01C 15/04* (2013.01); *A01M 9/0084* (2013.01)

(58) Field of Classification Search
CPC ........... A01C 15/14; A01C 15/00; A01C 7/08; A01C 7/00; A01C 15/006; A01C 15/005; A01C 15/04; A01M 9/0084; A01M 9/00
See application file for complete search history.

(56) References Cited

U.S. PATENT DOCUMENTS

| | | | |
|---|---|---|---|
| 3,804,332 | A | 4/1974 | Welch |
| 4,583,319 | A | 4/1986 | Wolff et al. |
| 4,852,809 | A | 8/1989 | Davis et al. |
| 4,964,575 | A | 10/1990 | Takata |
| 5,176,322 | A | 1/1993 | Sartor |

(Continued)

FOREIGN PATENT DOCUMENTS

| | | |
|---|---|---|
| DE | 102004030240 | 7/2015 |
| EP | 0170911 | 9/1989 |
| GB | 2170981 | 8/1986 |

*Primary Examiner* — Christopher J. Novosad
(74) *Attorney, Agent, or Firm* — Rebecca L. Henkel; Richard K. DeMille

(57) ABSTRACT

The present invention is directed to an applicator having an agricultural product pneumatic conveying system which meters particulate material from one or more source containers at the application equipment and transports the particulate material to evenly distribute the particulate material from the applicator. The pneumatic conveying system employs large diameter supply lines connected between the metering devices at the source containers and delivery nozzles, where the supply lines operate to move and mix the particulate material from the source containers to the nozzles. The particulate material is metered from the source containers into the supply lines via a number of airlocks that can be operated without allowing airflow from the large diameter supply lines to enter the source containers through the airlocks. In addition, the metering devices can b e operated in collective or independent variable manners to allow for sectional control and turning compensation.

16 Claims, 4 Drawing Sheets

(56) References Cited

U.S. PATENT DOCUMENTS

| | | |
|---|---|---|
| 5,251,818 A | 10/1993 | Manor et al. |
| 5,485,962 A | 1/1996 | Moss |
| 5,655,468 A | 8/1997 | Ledermann et al. |
| 5,816,498 A | 10/1998 | Smith, Jr. et al. |
| 5,971,295 A | 10/1999 | Jensen et al. |
| 6,116,284 A | 9/2000 | Murray et al. |
| 6,131,821 A | 10/2000 | Nejsum |
| 6,622,935 B1 | 9/2003 | Owens et al. |
| 8,733,257 B2 | 5/2014 | Beaujot et al. |
| 2010/0264568 A1* | 10/2010 | Dunn .................. B28B 17/026 264/630 |
| 2013/0333601 A1 | 12/2013 | Shivak |
| 2014/0193214 A1 | 7/2014 | Johnson et al. |
| 2015/0366127 A1 | 12/2015 | Roberge et al. |
| 2016/0095276 A1 | 4/2016 | Roberge et al. |

* cited by examiner

FERTILIZER APPLICATION SYSTEM USING PNEUMATIC CONVEYING WITH LARGE DIAMETER LINES AND ROTARY DISTRIBUTOR

FIELD OF THE DISCLOSURE

The present invention relates generally to agricultural equipment, and, more particularly, to an agricultural product delivery system on an application implement, such as a planter, seeder or fertilizer application equipment, for applying particulate material such as seed, fertilizer, herbicide or insecticide in a field, either as a surface application or deposited in the soil to improve soil quality.

BACKGROUND OF THE DISCLOSURE

Agricultural product delivery systems are known to utilize various mechanisms, including mechanical and pneumatic systems, i.e., a flow of air, to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, it is desirable to use a material supply source, such as a tank, with different applicator equipment by, for example, coupling the tanks with a planter for planting seed, and later coupling the same tank equipment with an applicator for applying needed pesticides and/or fertilizer. This has been difficult due to the necessary metering systems for applying the different materials. With the metering device provided on the tank, it is necessary to adjust the metering device whenever the tank is used for supplying a different material. This can be time consuming and inconvenient if the metering device is underneath the tank.

While the use of a metering system can effectively distribute the different particulate material to the various distribution channels and nozzles of the applicator, the metering system itself is a complex mechanism that must be accurately operated in order to effectively distribute the particulate matter to each nozzle and to accommodate for operational changes including additional particulate material(s) to be dispensed, sectional control and turning compensations, among others.

Further, with pneumatic delivery systems, the pressure drop across various portions of the delivery system can often result in different rates of the particulate material being dispensed from different channels and nozzles.

What is needed in the art is a pneumatic agricultural product conveying system which improves efficiency and convenience of the applicator without further complicating its construction and that provides a more even distribution across all channels and nozzles of the system.

SUMMARY OF THE DISCLOSURE

According to one aspect of the present disclosure, an applicator includes an agricultural product pneumatic conveying system which transfers particulate material from one or more source containers to application equipment on demand, and meters the material at the application equipment. The system includes a number of individual distribution channels or lines that are each interconnected with a number of product storage chambers within a tank. The lines each collect particulate material from each of the chambers and mix the particulate materials within the lines while directing the particulate materials to different sections of the booms extending outwardly from the applicator. The individual lines connected to each section of the booms enable the lines to maintain a relatively constant, static pressure along the entire section, thus providing an independently controllable distribution stream of the particulate material across each section.

According to another aspect of an exemplary embodiment of the invention, the lines are interconnected with each of the particulate material chambers by a metering system that can take form or rotary airlocks that maintain the air pressure within the lines while minimizing the leakage of air through the metering system into the chambers, which are unpressurized, thus maintaining air pressure within the lines. The rotation of the airlocks, optionally in conjunction with the pressure and/or speed of the airflow introduced in to the lines, can be controlled to vary the speed of the particulate material dispensed into the lines from the chambers, thereby providing the ability to accommodate various changes in the operational conditions of the applicator, including sectional control and turning compensations, among others.

According to still another aspect of an exemplary embodiment of the invention, each line is individually supplied with an airflow from a fan or similar device in order to pressurize the interior of the line for mixing and distribution of the particulate matter received therein.

According to another aspect of the invention, an agricultural product delivery system includes at least one particulate material supply compartment, a number of delivery units for applying particulate material from the supply compartment, and a pneumatic conveying system providing a mixed flow of particulate material from the at least one particulate material supply compartment to the particle delivery units, the conveying system including an airflow source and a number of supply lines each operably connected to the airflow source at one end, to the at least one particulate material supply compartment and to at least one of the particle delivery units at the opposite end.

According to a further aspect of the present invention, a method of delivering a number of agricultural products from a number of compartments containing the number of products to a number of particle delivering units applying the particles in a field, including the steps of supplying the number of agricultural products from the number of compartments to the pneumatic conveying system, mixing the agricultural product in the pneumatic conveying system to form a mixed product, conveying the mixed product to the particle delivering units; and applying the mixed product in an agricultural field.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure.

In the drawings.

DETAILED DESCRIPTION OF THE DISCLOSURE

Figure 1:
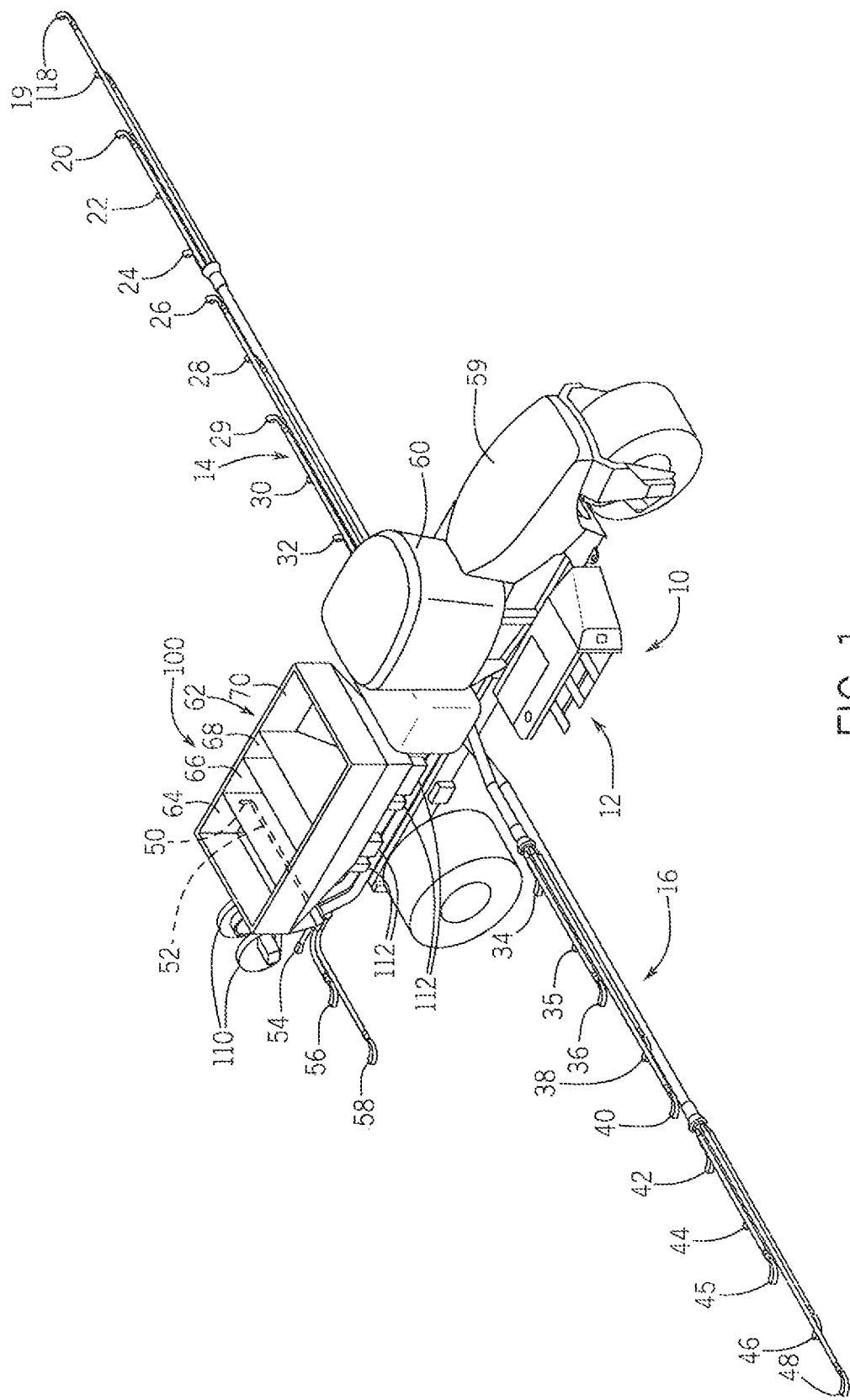
FIG. 1 is an isometric view of an agricultural application implement, in the nature of a fertilizer spreader, having a pneumatic conveying system according to one exemplary embodiment of the invention.
Figure 2:
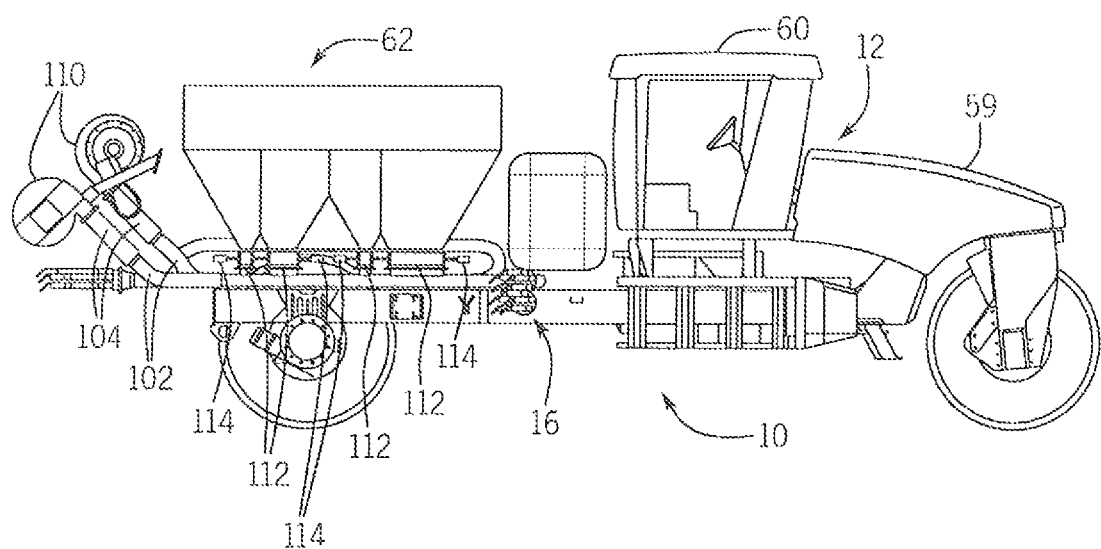
FIG. 2 is a side elevation view of the fertilizer spreader shown in FIG. 1.
Figure 3:
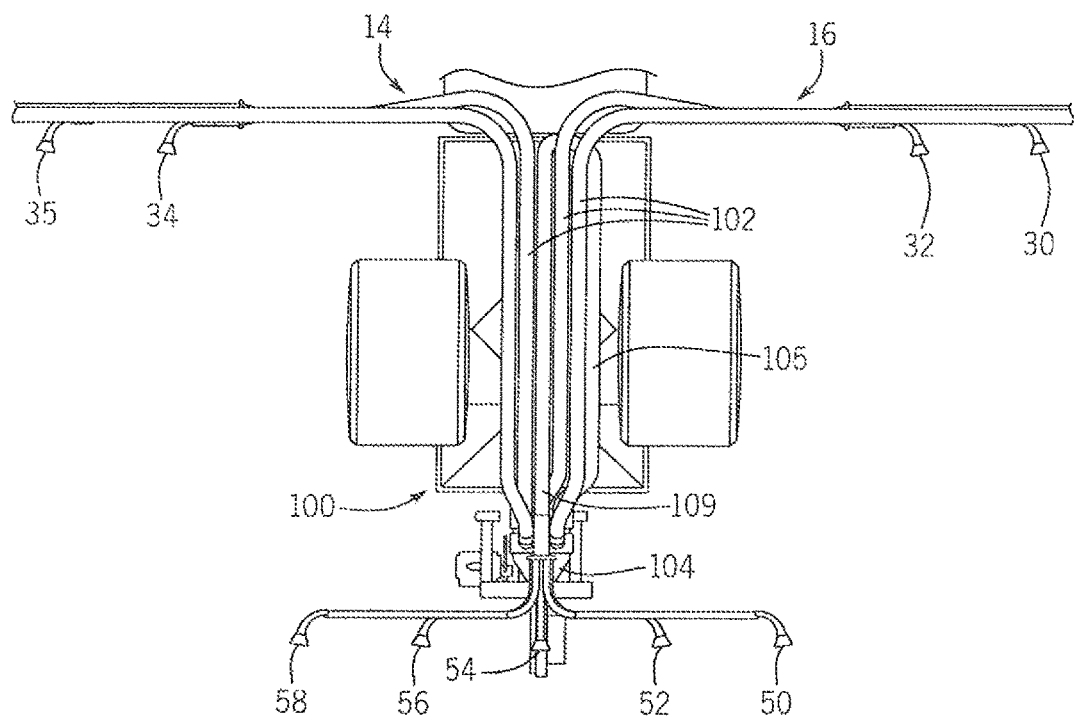
FIG. 3 is bottom plan view of the pneumatic conveying system according another exemplary embodiment of the invention.

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 includes ten nozzles 18, 19, 20, 22, 24, 26, 28, 29, 30 and 32; and boom 16 includes ten nozzles 34, 35, 36, 38, 40, 42, 44, 45, 46 and 48. Additionally, at the back of applicator 10 there are five rear nozzles 50, 52, 54, 56 and 58 to provide full and complete coverage across the width of implement 10, include the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 64 and 66 for carrying particulate material to be distributed to and disbursed by nozzles 18-58. Further smaller compartments 68, 70 can be provided to supply micro-nutrients or other materials to nozzles 18-58. The supply of particulate material A-D in compartments 64, 66, 68, 70 is replenished periodically from a still larger volume supply vehicle (not shown).

Fertilizer applicator 10 is illustrative of the types of equipment for which the pneumatic conveying system 100 can be used; however, it should be understood that the pneumatic conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above a pneumatic conveying system or assembly 100. The system 100 includes five large diameter supply lines 102, which in certain exemplary embodiments are between 3"-10" in diameter, and in other exemplary embodiments are between 4.5"-5" in diameter, that extend from a plenum 104 at one end, under the compartments 64-70 and terminate at the booms 14, 16 or at the rear nozzles 50-58. At the booms 14, 16, the supply lines 102 and the particulate material or product A-D transported therein can be split by a suitable distribution structure or mechanism 107 (FIG. 5), such as a horizontal rotary distributor(s) 108 (FIG. 5), among or into a number of secondary or smaller supply lines 106, which in certain exemplary embodiments are between 1.5"-4" in diameter, and in other exemplary embodiments are between 2.5"-3" in diameter, that are connected to the nozzles 18-58.

To collect and drive the particulate material A-D along the lines 102, in the illustrated embodiment one or more fans 110 are operably connected to the plenum 104 opposite the lines 102. The air flow from the fans 110 is directed from the fans 110 through the plenum 104 and into the respective lines 102 as a result of the structure of the plenum 104. After the air flow passes through the one or more plenums 104 connected to the one or more fans 110 and collects/entrains the particulate material A-D from the compartments 64-70 in a manner to be described, the air flow continues to flow along each of four (4) of the large diameter lines 102 that make approximately a 90° turn to connect to the booms 14, 16.

In order to spread the particulate material/product A-D over/onto the center section over which the machine 10 passes, a large line 102 must move product A-D to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, the line 102 turns 180° and has a rearward section 109 that passes beneath the compartments 64-70 where the line 102 collects the particulate material/product A-D and transports the product A-D to the nozzles 50-58 at the rear of the machine 10.

In a different configuration the line 102 which carries air to the front could be placed between the frame rails (not shown) of the machine 10 or in any other suitable location that can accommodate the line 102. In the illustrated exemplary embodiment two large diameter lines 102 are stacked vertically on top of each other in order to provide more rigidity to the support structure formed by the lines 102 upon reaching the booms 14,16. However, this configuration could be changed to a horizontal arrangement of the lines 102 which would result in less bends and a more uniform nozzle height along the booms 14,16.

Figure 4:
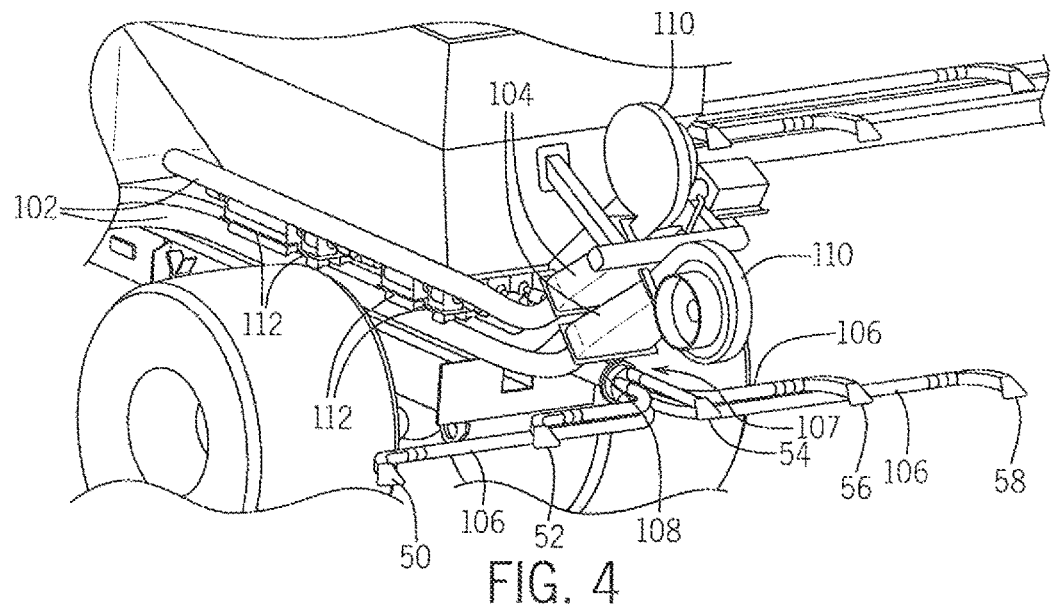
FIG. 4 is an isometric view of a pneumatic conveying system on a fertilizer spreader according to another exemplary embodiment of the invention.

Looking now at FIGS. 1, 2 and 4, in the illustrated exemplary embodiment the plenums 104 provide airflow from the fans 110 to all five lines 102 of the system 100, with one plenum 104 connected to the two (2) outside lines 102, with the other plenum 104 supplying the air flow to the center three (3) lines 102. The lines 102 are split in this fashion because of the higher pressure drop associated with the outermost lines 102 as a result of their length. With only the two higher pressure lines supplied by one plenum 104, it allows the fan 110 connected to the longer lines 102 to supply a higher pressure airflow through these lines 102 since less airflow is required for two lines 102 vs three lines 102. In the illustrated exemplary embodiment, the two fans 110 and associated plenums 104 are stacked vertically with respect to one another. However a different configuration can be utilized where the fans 110 and plenums 104 are arranged in the same horizontal plane in order to minimize the space requirements, with the plenums 104 also optionally being rotated 90° from the illustrated configuration.

Referring now to FIGS. 2 and 4, in the illustrated exemplary embodiment the particulate material/product A-D contained within, each of the compartments 64-70 of the tank 62 is introduced into the airflow in the various lines 102 via airtight product metering devices, that in an exemplary embodiment take the form of rotary airlocks 112 that function to meter the product flowing from the compartments 64-70 into each line 102. The airlocks 112 provide a mechanical airtight barrier between the pressure differential created from the large diameter line 102 and the tank 62 since the tank 62 and the individual compartments 64-70 within the tank 62 are not pressurized. The number of rotary airlocks 112 required is dependent on the number of lines 102 and the number of compartments 64-70 within the tank 62. With five lines 102 and four compartments 64-70, twenty airlocks 112 are utilized to dispense particulate material A-D from each compartment 64-70 into each line 102. Each airlock 112 can be independently controlled to meter the particulate material/product A-D individually into lines 102 thus achieving sectional control and turning compensation. In addition, in an exemplary embodiment, the size, e.g. the length and/or width, of the airlock 112 is determined based on the flow rate of the particulate material A-D desired through the airlock 112 when operated, i.e., for higher application rates a longer airlock 112 is required, whereas for low application rates a shorter airlock 112 can be used. To operate the airlocks 112, in the illustrated exemplary embodiment the airlocks 112 are operably connected to one or more hydraulic motor(s) 114 that are independently controllable by the operator of the machine 10, in order to control the flow rate of the individual particulate material/product A-D being dispensed from the nozzles 18-48 and 50-58. However, in alternate configurations for the machine 10 and/or the pneumatic, system 100, electric or pneumatic motors (not shown) can be utilized in place of the hydraulic motor(s) 114.

Figure 5:
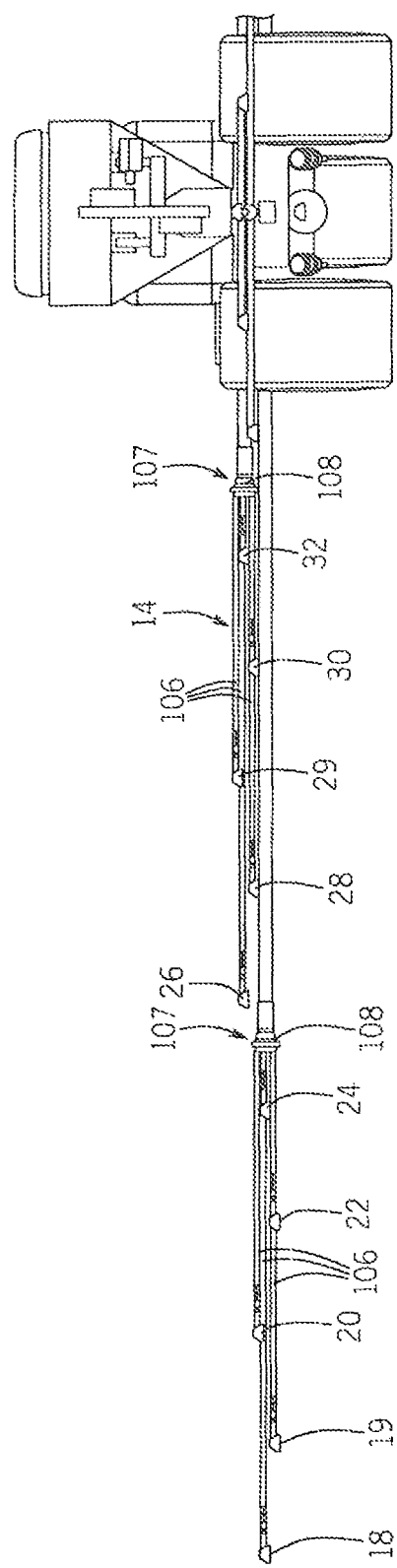
FIG. 5 is a side plan view of a boom section and pneumatic conveying system of FIG. 3.

Looking now at FIG. 5, each boom 14, 16 includes a pair of large diameter lines 102 that are split into smaller lines 106 by a suitable mechanism or structure, such as a rotary distributor 108. Each of the smaller lines 106 is formed with a different length in order to separate the nozzles 18-48 disposed on the ends of each line 106 with equal spacing and to attain an even spread pattern across the booms 14,16. In the illustrated exemplary embodiment, the smaller lines 106 are also positioned at different heights relative to one another, due to the circular design of the rotary distributor 108. Other alternative configurations for the lines 106 can include flexible hoses joining the rotary distributor 108 to the smaller lines 106 in order to place the nozzles 18-48 in the same horizontal plane and achieve a better spread pattern across the booms 14,16. Further, to achieve a wider working width, an extra smaller line 106 and associated nozzle (not shown) can be added to the rotary distributor 108 design thus adding one line 106 and nozzle per section of the booms 14,16.

While the pneumatic conveying system 100 disclosed so far herein have been primarily with respect to fertilizer application equipment or applicator commonly referred to as a "floater", it should be understood that the advantages from the pneumatic conveying system 100 disclosed herein can be obtained on other types of equipment for applying particulate materials/product in a field. Sowers of various types, such as a planter, drill or seeder, are known to include an applicator unit, such as a drill or seeder, and may include an air cart having one or more bulk tanks carrying fertilizer and/or seeds to be planted. The pneumatic conveying system 100 disclosed herein, can be provided on the planter, and one or more inductor on the air cart. If the air cart is then used with a planter of a different type, or with another type of particle application equipment, adjustments to the pneumatic conveying system 100 can be made without the need to adjust the inductor assembly on the air cart. Accordingly, switching from one crop to another crop or from one planter to another planter does not require major adjustment of the inductor assembly on the air cart.

In using a pneumatic conveying system 100 as disclosed herein, a variety of materials can be applied by a variety of different implements. The particulate material to be applied is contained in one or more compartments. The particulate material or materials are supplied from the tanks to the pneumatic conveying system 100 wherein the material or materials are conveyed to one or more particle injectors while being intermixed with one another. At the particle injector the conveyed product or products are provided in a metered flow and transferred to one or more particle delivery units, which can be a broadcast spreader, seeder for depositing seeds or other materials across the surface of soil, a row opener unit for depositing seeds or other material in rows, or the like.

Various other alternatives are contemplated as being within the scope of the following claims particularly pointing out and distinctly claiming the subject matter regarded as the invention.

We claim:

1. An agricultural product delivery system, comprising:
a plurality of particulate material supply compartments;
a number of delivery units for applying particulate material from the plurality of particulate material supply compartments; and
a pneumatic conveying system providing a mixed flow of particulate material from the plurality of particulate material supply compartments to the number of particle delivery units, the pneumatic conveying system including:
an airflow source;
a number of supply lines each operably connected to the airflow source at one end, to the plurality of particulate material supply compartments and to at least one of the number of particle delivery units at the opposite end; and
at least one airtight metering device connected between the plurality of particulate material supply compartments and the number of supply lines.

2. The agricultural product delivery system of claim 1 wherein the at least one metering device comprises a rotary airlock.

3. The agricultural product delivery system of claim 2, wherein the pneumatic conveying system comprises:
a first airflow source connected to a first portion of the number of supply lines; and
a second airflow source connected to a second portion of the number of supply lines.

4. The agricultural product delivery system of claim 3, wherein the first portion of supply lines are interconnected with a portion of the number of delivery units positioned furthest from the first and second airflow sources.

5. The agricultural product delivery system of claim 3, wherein at least one of the second portion of the number of supply lines comprises:
   a forward section extending from the second airflow source towards a front of the system, and;
   a rearward section that extends from the front of the system to a portion of the number of delivery units disposed at the rear of the system, the rearward section interconnected with the plurality of particulate material supply compartments.

6. An agricultural product delivery system, comprising:
   at least one particulate material supply compartment;
   a number of delivery units for applying particulate material from the at least one particulate material supply compartment; and
   a pneumatic conveying system pro viding a mixed flow of particulate material from the at least one particulate material supply compartment to the number of particle delivery units, the pneumatic conveying system including:
      an airflow source;
      a number of supply lines each operably connected to the airflow source at one end, to the at least one particulate material supply compartment and to at least one of the number of particle delivery units at an opposite end;
      at least one airtight metering device connected between the at least one particulate material supply compartment and the number of supply lines;
      a first airflow source connected to a first portion of the number of supply lines; and
      a second airflow source connected to a second portion of the number of supply lines;
      a first plenum connected between the first airflow source and the first portion of the number of supply lines; and
      a second plenum disposed between the second airflow source and the second portion of the number of supply lines;
   wherein the at least one airtight metering device includes a rotary airlock.

7. The agricultural product delivery system of claim 6, wherein the first plenum and the second plenum are vertically stacked with regard to one another.

8. An agricultural product delivery system, comprising:
   at least one particulate material supply compartment;
   a number of delivery units for applying particulate material from the at least one supply compartment;
   a pneumatic conveying system providing a mixed flow of particulate material from the at least one particulate material supply compartment to the number of particle delivery units, the pneumatic conveying system including:
      an airflow source;
      a number of supply lines each operably connected to the airflow source at one end, to the at least one particulate material supply compartment and to at least one of the number of particle deli very units at an opposite end;
      at least one airtight metering device connected between the at least one particulate material supply compartment and the number of supply lines; and
      a number of secondary supply lines interconnected between each supply line of the number of supply lines and the number of delivery units.

9. The agricultural product delivery system of claim 8, further comprising a product distribution device disposed between each of the number of supply lines and each of the number of secondary supply lines.

10. The agricultural product delivery system of claim 9, wherein the product distribution device is a rotary distributor.

11. An agricultural product delivery system, comprising:
   a number of particulate material supply compartments;
   a number of delivery units for applying particulate material from the number of particulate material supply compartments;
   a pneumatic conveying system providing a mixed flow of particulate material from each of the number of particulate material supply compartments to the number of delivery units, the conveying system comprising:
      a number of airflow sources;
      a number of supply lines each operably connected to at least one of the number of airflow sources at one end, and to at least one of the number of delivery units at an opposite end; and
      a number of airtight product metering devices, each of the number of airtight product metering devices operably connected between each of the number of supply lines and each of the number of particulate material supply compartment.

12. A method of delivering a number of agricultural products from a number of compartments housing the number of products to a number of particle delivering units applying the particles in an agricultural field, comprising the steps of:
   supplying the number of agricultural products from the number of compartments to a pneumatic conveying system, the pneumatic conveying system including:
      an airflow source;
      a number of supply lines each operably connected to the airflow source at one end, to at least one of the number of supply compartments and to at least one of the number of particle delivery units at an opposite end;
      at least one airtight metering device connected between the at least one of the number of compartments and the number of supply lines;
   metering the number of agricultural products into the pneumatic conveying system;
   mixing the number of agricultural products in the pneumatic conveying system to form a mixed product;
   conveying the mixed product to the number of particle delivery units; and
   applying the mixed product in the agricultural field.

13. The method of claim 12, wherein the step of supplying the number of agricultural products comprises controlling the operation of the at least one airtight metering device.

14. A method of delivering a number of agricultural products from a number of compartments housing the number of agricultural products to a number of particle delivering units applying the particles in an agricultural field, comprising the steps of:
   supplying the number of agricultural products from the number of compartments to a pneumatic conveying system, the pneumatic conveying system including:
      a number of airflow sources;
      a number of supply lines each operably connected to at least one of the number of airflow sources at one end, and to at least one of the number of particle delivery units at an opposite end; and a number of airtight product metering devices, each of the number of airtight product metering devices operably connected between each of the number of supply lines and each of the number of compartments;

metering the number of agricultural products into the pneumatic conveying system;

mixing the number of agricultural products in the pneumatic conveying system to form a mixed product;

conveying the mixed product to the number of particle delivering units; and applying the mixed product in the agricultural field.

15. The method of claim 14, wherein the step of supplying the number of agricultural products comprises controlling the operation of the at least one airtight metering device to meter an amount of the number of agricultural products supplied to the pneumatic conveying system.

16. The method of claim 14, wherein the step of conveying the mixed product comprises altering a speed of air flow from one or more of the number of airflow sources.

* * * * *